United States Patent
Slaughter et al.

(10) Patent No.: US 12,375,302 B2
(45) Date of Patent: Jul. 29, 2025

(54) CRYPTOGRAPHIC ASSERTIONS FOR CERTIFICATE ISSUANCE

(71) Applicant: Amazon Technologies, Inc., Seattle, WA (US)

(72) Inventors: Michael S Slaughter, Stone Mountain, GA (US); Trevoli Ponds-White, Seattle, WA (US); James Darrin Flanagan, Coupeville, WA (US); Georgy Sebastian, Everett, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/642,700

(22) Filed: Apr. 22, 2024

(65) Prior Publication Data

US 2024/0275615 A1    Aug. 15, 2024

Related U.S. Application Data

(63) Continuation of application No. 17/544,767, filed on Dec. 7, 2021, now Pat. No. 12,003,655.

(51) Int. Cl.
*H04L 9/32* (2006.01)
*H04L 9/14* (2006.01)

(52) U.S. Cl.
CPC ............. *H04L 9/3268* (2013.01); *H04L 9/14* (2013.01)

(58) Field of Classification Search
CPC ......... H04L 9/3268; H04L 9/14; H04L 9/321; H04L 9/3247
See application file for complete search history.

(56) References Cited

U.S. PATENT DOCUMENTS

| | | | |
|---|---|---|---|
| 5,745,574 A * | 4/1998 | Muftic | H04L 9/3268 713/157 |
| 6,216,231 B1 | 4/2001 | Stubblebine | |
| 6,584,565 B1 | 6/2003 | Zamek | |
| 7,899,755 B2 * | 3/2011 | Whitfield | G06Q 20/382 705/52 |
| 10,454,689 B1 | 10/2019 | Sharifi Mehr | |

(Continued)

OTHER PUBLICATIONS

Jayaraman, Bargav, Hannah Li, and David Evans. "Decentralized certificate authorities," arXiv preprint arXiv:1706.03370 (2017).*

(Continued)

*Primary Examiner* — Jimmy H Tran
(74) *Attorney, Agent, or Firm* — Robert C. Kowert; Kowert, Hood, Munyon, Rankin & Goetzel, P.C.

(57) ABSTRACT

Components of a public certificate authority (CA) generate respective cryptographic assertions during performance of respective tasks of a certificate issuance workflow and a workflow approval component approves/rejects certificate issuance, based upon verification of the cryptographic assertions. For example, a workflow manager may assign tasks of a certificate workflow process to a number of components that process the tasks. The components generate responses and sign the respective responses with keys particular to each component. The workflow manager gathers the cryptographic assertions and sends them to a workflow approval component that validates the assertions, verifies the assertions indicate successful completion of the workflow and approves or rejects certificate issuance.

20 Claims, 12 Drawing Sheets

(56) References Cited

U.S. PATENT DOCUMENTS

| | | | |
|---|---|---|---|
| 11,190,504 B1 | 11/2021 | Ah Kun | |
| 11,323,274 B1 | 5/2022 | Bowen | |
| 11,563,590 B1 | 1/2023 | Bowen | |
| 11,888,997 B1* | 1/2024 | Bowen | H04L 9/3247 |
| 12,101,417 B1* | 9/2024 | Slaughter | H04L 9/321 |
| 2001/0032310 A1* | 10/2001 | Corella | H04L 9/006 |
| | | | 713/156 |
| 2002/0029337 A1* | 3/2002 | Sudia | H04L 9/3268 |
| | | | 380/282 |
| 2002/0152173 A1* | 10/2002 | Rudd | G06F 21/6209 |
| | | | 705/57 |
| 2002/0188843 A1 | 12/2002 | Kocher | |
| 2004/0093493 A1* | 5/2004 | Bisbee | H04L 9/3247 |
| | | | 713/156 |
| 2005/0081025 A1* | 4/2005 | Thornton | H04L 63/20 |
| | | | 713/155 |
| 2005/0138363 A1* | 6/2005 | Fox | H04L 9/3263 |
| | | | 713/156 |
| 2006/0129817 A1* | 6/2006 | Borneman | H04L 67/53 |
| | | | 713/170 |
| 2011/0013771 A1 | 1/2011 | Camenisch | |
| 2011/0099367 A1 | 4/2011 | Thom | |
| 2011/0113240 A1 | 5/2011 | Fu | |
| 2011/0213961 A1 | 9/2011 | Wnuk | |
| 2014/0136838 A1* | 5/2014 | Mossbarger | H04L 63/0823 |
| | | | 713/156 |
| 2015/0058960 A1 | 2/2015 | Schmoyer | |
| 2016/0127353 A1 | 5/2016 | Thomas | |
| 2016/0142211 A1 | 5/2016 | Metke | |
| 2016/0277192 A1 | 9/2016 | Kaliski, Jr. | |
| 2018/0183586 A1* | 6/2018 | Bhargav-Spantzel | |
| | | | G06F 21/32 |
| 2018/0278427 A1 | 9/2018 | Thakor | |
| 2019/0028281 A1 | 1/2019 | Turissini | |
| 2019/0036708 A1 | 1/2019 | Fregly | |
| 2019/0149524 A1 | 5/2019 | Bankston | |
| 2019/0260595 A1* | 8/2019 | Walton | H04L 9/3268 |
| 2019/0312734 A1 | 10/2019 | Wentz et al. | |
| 2019/0342096 A1 | 11/2019 | Starosielsky | |
| 2019/0363882 A1 | 11/2019 | Levy | |
| 2020/0052898 A1 | 2/2020 | Wentz | |
| 2020/0112442 A1 | 4/2020 | Wentz | |
| 2020/0127998 A1* | 4/2020 | Pendarakis | H04L 63/0823 |
| 2021/0273791 A1 | 9/2021 | Levy | |
| 2021/0326872 A1 | 10/2021 | Robotham | |
| 2021/0374728 A1 | 12/2021 | Bankston | |
| 2022/0029982 A1 | 1/2022 | Juma | |
| 2023/0179429 A1* | 6/2023 | Rosenthol | H04L 9/321 |
| | | | 713/156 |

OTHER PUBLICATIONS

Jiang, Yong, et al. "A Certificate Life-cycle Management System Based on Blockchain in 5G." 2019 6th International Conference on Information Science and Control Engineering (ICISCE). IEEE, 2019.*

Zhao, Jian, et al. "TrustCA: achieving certificate transparency through smart contract in blockchain platforms." 2020 International Conference on High Performance Big Data and Intelligent Systems (HPBD&IS). IEEE, 2020.*

"AWS Certificate Manager", https//www.amazon.com/certificate-manager/?c=sc&sec=srv, dated 2021, pp. 1-7.

U.S. Appl. No. 17/544,755, filed Dec. 7, 2021, Michael S. Slaughter, et al.

U.S. Appl. No. 17/544,767, filed Dec. 7, 2021, Michael S. Slaughter, et al.

Czeskis, Alexei, et al., "Strengthening user authentication through opportunistic cryptographic identity assertions," Proceedings of the 2012 ACM conference on Computer and communications security, 2012.

Bangerter, Endre, Jan Camenisch, and Anna Lysyanskaya, "A cryptographic framework for the controlled release of certified date," Security Protocols: 12th International Workshop, Cambridge, UK, Apr. 26-28, 2004, Revised Selected Papers 12, Springer Berlin Heidelberg, 2006.

Petcher, Adam, and Greg Morrisett, "The foundational cryptography framework," Principles of Security and Trust: 4th International Conference, POST 2015, Held as Part of the European Joint Conferences on Theory and Practice of Software, ETAPS 2015, London, US, Apr. 11-18, 2015, Proceedings 4, Springer Berlin Heidelberg.

Prabhu Kavin, Balasubramanian, et al., "An enhanced security framework for secured data storage and communications in cloud using ECC, access control and LDSA," Wireless Personal Communications 115, 2020, pp. 1107-1135.

* cited by examiner

*Cryptograph Assertion*
302

Fields
Claim (work done)
Subject (the certificate)
Request ID
Expiration Time
Component identifier (to know which component is making the assertion, used to know which key to use to decrypt signature of assertion)

*FIG. 3A*

CRYPTOGRAPHIC ASSERTIONS FOR CERTIFICATE ISSUANCE

PRIORITY APPLICATION

This application is a continuation of U.S. patent application Ser. No. 17/544,767, filed Dec. 7, 2021, which is hereby incorporated by reference herein in its entirety.

BACKGROUND

Certificate authorities (CAs) issue digital certificates. A digital certificate certifies the ownership of a public key by the named subject of the certificate. This allows others (relying parties) to rely upon signatures or on assertions made about the private key that corresponds to the certified public key. A CA acts as a trusted third party-trusted both by the subject (owner) of the certificate and by the party relying upon the certificate. One particularly common use for certificate authorities is to sign certificates used in HTTPS, the secure browsing protocols for the World Wide Web (or to use in SSL, TLS, etc.). An example certificate is an end entity certificate, sometimes installed on servers, machines, cryptographic hardware and devices (e.g., SSL/TLS issued to servers, code signing, client certificates issued to individuals for email encryption, digital signing, authentication).

A certificate authority may issue certificates in accordance with a set of policies enforced at a specific point-in-time that dictate the process that led to issuance, the contents of the certificate, the keys used to sign and/or the infrastructure in place to support it. Failing to satisfy all of the policy constraints results in mis-issuance event that may lead to the revocation of a customer's certificate and damages the reputation of the issuing authority.

BRIEF DESCRIPTION OF THE DRAWINGS

FIG. 3A illustrates a cryptographic assertion for versioned policy collection management and cryptographic assertions for certificate issuance, according to some embodiments.

Figure 1:
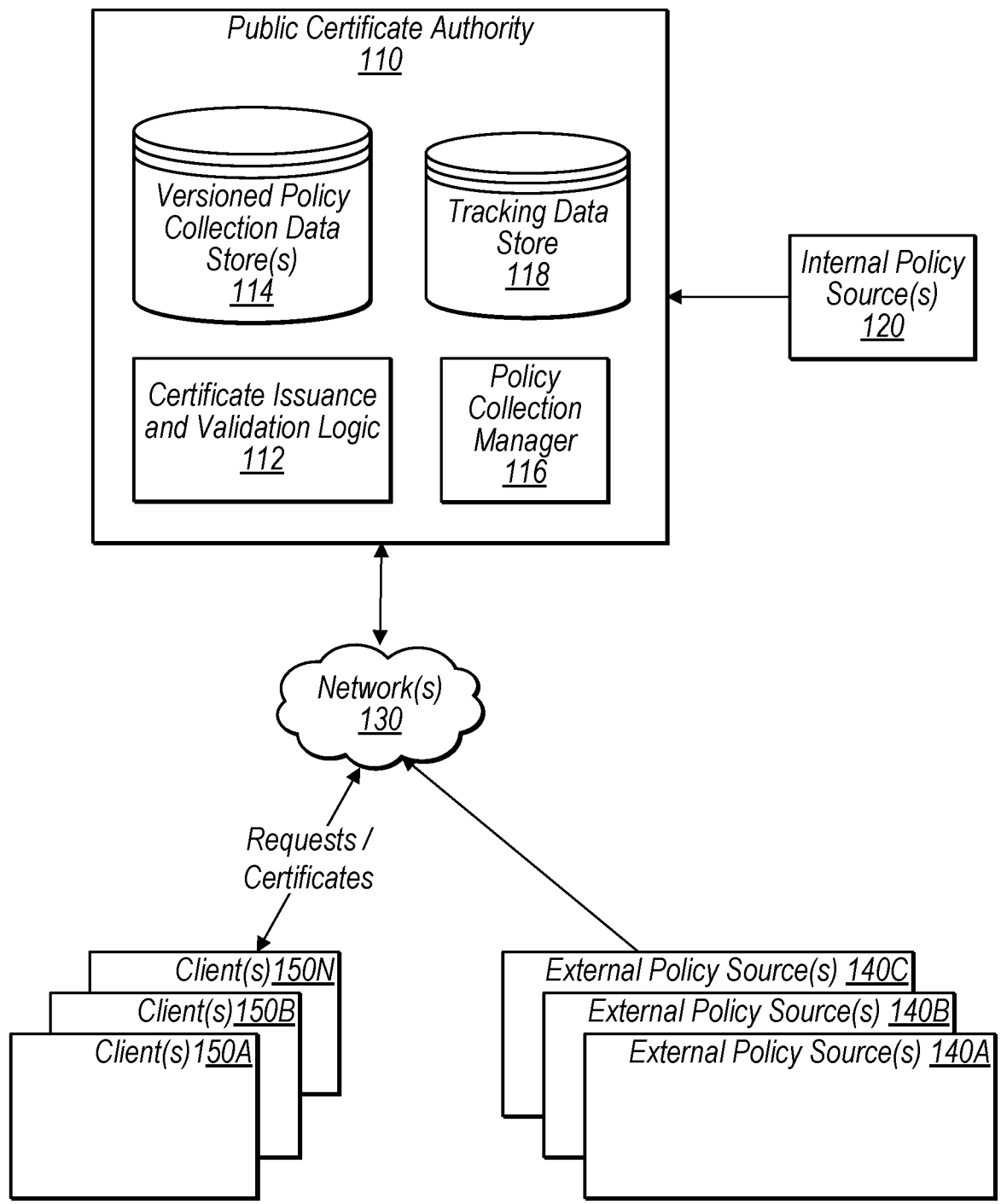
FIG. 1 illustrates a system architecture in which versioned policy collection management and cryptographic assertions for certificate issuance is implemented, according to some embodiments.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. Headings used herein are for organizational purposes only and are not meant to be used to limit the scope of the description.

DETAILED DESCRIPTION OF EMBODIMENTS

As discussed in more detail below, systems and methods for versioned policy collection management, and cryptographic assertions, for certificate issuance is disclosed. Although, as this specification makes clear, the functionality associated with versioned policy collection management may be implemented in a system that also implements the functionality associated with the cryptographic assertions, it is also contemplated that the functionality of either may be implemented without the other, in at least some embodiments.

When a Public Certificate Authority (CA) decides to issue a certificate, that issuance decision may be made based on a set of policies enforced at a specific point-in-time that dictate the process led to issuance, the contents of the certificate, the keys used to sign and the infrastructure in place to support it. Failing to satisfy that all of the policy constraints may result in mis-issuance event that may lead to the revocation of a customer's certificate and damages the reputation of the issuer.

A Public CA system may responsible for ensuring that the all certificates are issued satisfy those requirements and ensuring that changes to any of the dependent policies are enforced. To accomplish this, the Public CA system may implement an ability to understand what set of rules are in place for a specific issuance event, verify that the process and artifacts created (referred to as policies, herein) will meet those requirements and keep track of that historical context. Such functionality may be a challenge because the policy versions may change at different frequencies and with widely varying degrees of impact to the core business logic.

Non-limiting examples of changes range from inconsequential documentation updates all the way to deprecation of a domain validation method. A Public CA system may benefit from a mechanism for ingesting policies changes in a way that minimizes system impact for non-impactful changes while also safely updating logic to support changes to core business logic.

Versioned Policy Collections

In embodiments, versioned policy collections help ensure that a certificate authority (CA) is following the policy specified in the Certificate Practice Statement (CPS), properly verifying customers and protecting keys. In some embodiments, a policy collection is a mechanism that puts the set of rules from a group of various different policies into a common format that the Public CA system can leverage programmatical. In some embodiments, the policy collection is a versioned snapshot set of specific versions of a curated list of contributing policies and artifacts (collectively referred to as policies, herein) relevant to public certificate issuance. Each of these contributing policies may release changes at various rates that have varying degrees of impact. Some changes, for example, deprecate a domain validation method which will require code changes to implement while others simply update or clarify existing wording in a document. Having a mechanism that allows selective management of the set of revisions made in a contributing policy into a single policy revision that can be updated at a specified time provides the ability to safely model and characterize the impact of each change and leverage deployment safety mechanisms such as gradual deployment and version rollback when implementing them, in various embodiments.

Additionally, the policy collection may provide the Public CA system a traceability mechanism that can be used for operational purposes, yearly compliance audits and investigations. Understanding the set of rules that govern a given issuance or validation request may also simplify the testing and correctness verification mechanisms of the Public CA system.

A non-limiting example of a set of policies for public certificate authorities is a set of constraints and guidelines maintained by the CA Browser Forum called the Baseline Requirements. Additionally, there are policies that may have significant impact on the ability of customers to acquire or make use of x.509 certificates, such as web browser-specified policies, for example.

In embodiments, a versioned policy collection is a collection of policies (from external and/or internal sources that are relied on as part of public certificate issuance. Versioned policy collections may be useful for adding compliance traceability to certificate issuance and validation requests, in embodiments. Versioned policy collections may also facilitate deployment changes related to system compliance in a controlled manner and produce metadata that can directly support periodic audits, in some embodiments.

The policy collection version may be associated with a certificate issuance request (e.g., by a Frontend Service of the Public CA or otherwise) and propagated throughout the system by certificate issuance and validation logic that receives the policy collection version as part of the request metadata. In some embodiments, components of the certificate issuance and validation logic may determine, from the versioned policy collection data store, the current version of the policy collection and apply it (instead of having it assigned by the request, for example).

Domain validations, performed by the certificate issuance and validation logic, may utilize a policy collection when corresponding tasks for that workflow are performed, in some embodiments.

A workflow approval component may perform additional input validation based on the policy collection (e.g., as required) and enforce a minimum policy collection version for the system, in some embodiments. A certificate correctness component may ensure that the certificate rules a certificate is verified against aligns with the policy collection version for that request, in some embodiments.

Cryptographic Assertions

In embodiments, prior to performing an action such as issuing a certificate, verification work may be performed. Such work may provide assurances that a specific certificate is approved to proceed and that artifacts produced during the certificate issuance workflow meet required specifications before a certificate is issued or released outside of the system, in some examples. In some embodiments, components of the certificate issuance may play an authoritative role in protecting the certificate issuance logic from mis-issuance. It may be beneficial to protect integrity of decisions made by each component and ensure that messages being passed are generated by a trusted source. In an example solution, digital signatures may be used to provide such assurances. Some of the following embodiments describe implementation of a signature/verification mechanism using cryptographic assertions.

In some embodiments, certificate issuance system 112 may require a signing/verification technique that satisfies the following requirements: The system provides for signing and verification by stateless systems, and/or the system provides for signing and verification by server-less systems. Additionally, or optionally, the system may provide for the signing and verification of API response objects from all certificate issuance components, and/or the system may provide a mechanism that all services can use to determine the correct verification source.

Certificate Issuance Workflow Approval Component

The certificate issuance workflow approval component (illustrated in FIG. 112, described below) may be responsible for ensuring that all required checks and validations have been performed prior to allowing the issuance of a certificate. For example, such a process may be performed by the certificate issuance logic 112 through the generation and signature verification of signed strings called assertions. In embodiments, an assertion includes a claim (e.g., all domains are validated), a subject (e.g., a hash of a CSR), a unique request identifier, and/or an expiration time.

As part of the certificate issuance workflow, assertions are collected by the certificate workflow manager as outputs of the interaction of with each component. The assertions are then provided as inputs to the certificate issuance workflow approval component where the signature is verified and if valid, used to determine if an issuance request should proceed. In embodiments, such a mechanism allows the certificate issuance workflow approval component to remain stateless and prevents the need to have direct dependencies on every other service while ensuring that sub-components of the Public CA system processed a request prior to allowing a certificate issuance Certificate Authorities Certificate authorities (CAs) issue digital certificates that certify ownership of a public key by the named subject of the certificate. Certificates have a number of users and uses, including consumers and businesses that utilize the security applications of Public Key Infrastructure (PKI) a technology that enables secure e-commerce and network-based communication. A public key certificate, also known as a digital certificate or identity certificate, is an electronic document used to prove the ownership of a public key.

Generally, an entity such as an administrator or client sends a certificate signing request to a CA to obtain a signed certificate for or on behalf of a subject, such as a domain. The request may include a public key associated with the subject domain. The signed certificate that is returned includes information about the key, information about the identity of its owner (called the subject), and the digital signature of an entity that has verified the certificate's contents (called the issuer). If the signature is valid, and the software examining the certificate trusts the issuer, then it can use that key to communicate securely with the certificate's subject.

Attention will not be brought to the FIGS. 1-9. Generally, block diagrams 1-3 and 8-9 illustrate components that may perform functionality illustrated and described for process diagrams 4, 5A, 5B, 5C, 6 and 7. While the following description may attribute certain functionality to certain components, it is contemplated that various of the functionality may be performed by other components, without departing from the scope of this specification. Also, it is contemplated that a system with more or fewer components than those illustrated may perform the functionality described herein, in embodiments.

FIG. 1 illustrates a system architecture in which versioned policy collection management and cryptographic assertions for certificate issuance is implemented, according to some embodiments. In the illustrated embodiment, a public certificate authority 110 includes a versioned policy collection data store(s) 114 (which may include one or more distributed data stores, in some embodiments). The illustrated versioned policy collection data store(s) 114 stores versioned policy collections (e.g., illustrated in FIG. 3B, described below). In some embodiments, the versioned policy collection data store(s) 114 also stores individual policies, but it is contemplated that individual policies may also be stored separately in an individual policy data store 302 (e.g., illustrated in FIG. 3B as data store 302, described below). The data store may store policies from internal policy source(s) 120. For example, a public certificate authority may receive individual policies and/or updates to those policies from processes or organizations considered internal to an entity responsible for the public certificate authority. In one embodiment, the public certificate authority may receive internal policies from an organization or process internal to a service provider or enterprise that runs the public certificate authority 110.

The data store may store policies from external policy source(s) 140A-C. For example, a public certificate authority may receive individual policies and/or updates to those policies from processes or organizations considered external to an entity responsible for the public certificate authority. In one embodiment, the public certificate authority may receive external policies from an organization or process external to a service provider or enterprise that runs the public certificate authority 110 (e.g., from public trust store providers such as but not limited to browser providers, or the CA/Browser Forum (e.g., "Extended Validation (EV) Guidelines," and "Baseline Requirements")) or other industry organizations or standards bodies.

FIG. 1 also illustrated policy collection manager 116 that may perform various functionality associated with lifecycle management of the versioned policy collections. For example, policy collection manager 116 may provide an interface for an admin or other privileged user to specify the individual underlying policies of a policy collection, to update, modify, add, or remove, etc., underlying policies and/or policy collections. In some embodiments, the policy collection manager 116 may provide versioning control for the policy collections as well as the underlying policies.

FIG. 1 illustrates certificate issuance and validation logic 112 of the public certificate authority 110. Generally, certificate issuance and validation logic 112 of the public certificate authority 110 may respond to certificate requests from clients (e.g., client(s) 150A-N) by executing functionality associated with the request, such as but not limited to certificate validation and/or certificate issuance, and providing certificates in response. As illustrated and described herein, the certificate issuance and validation logic 112 may perform the functionality in accordance with rules indicated by individual ones of a set of policies specified by a policy collection record stored in the versioned policy collection data store 114. In some embodiments, the versioned policy collection(s) may update (e.g., based on internal source(s) 120 or based on external source(s) 140A-N) without interrupting and/or without requiring manual changes to, the certificate issuance and validation logic 112. Additionally, having the versioned policy collection data store(s) 114 may facilitate greater compliance with audits of the certificates, in some embodiments.

Figure 2:
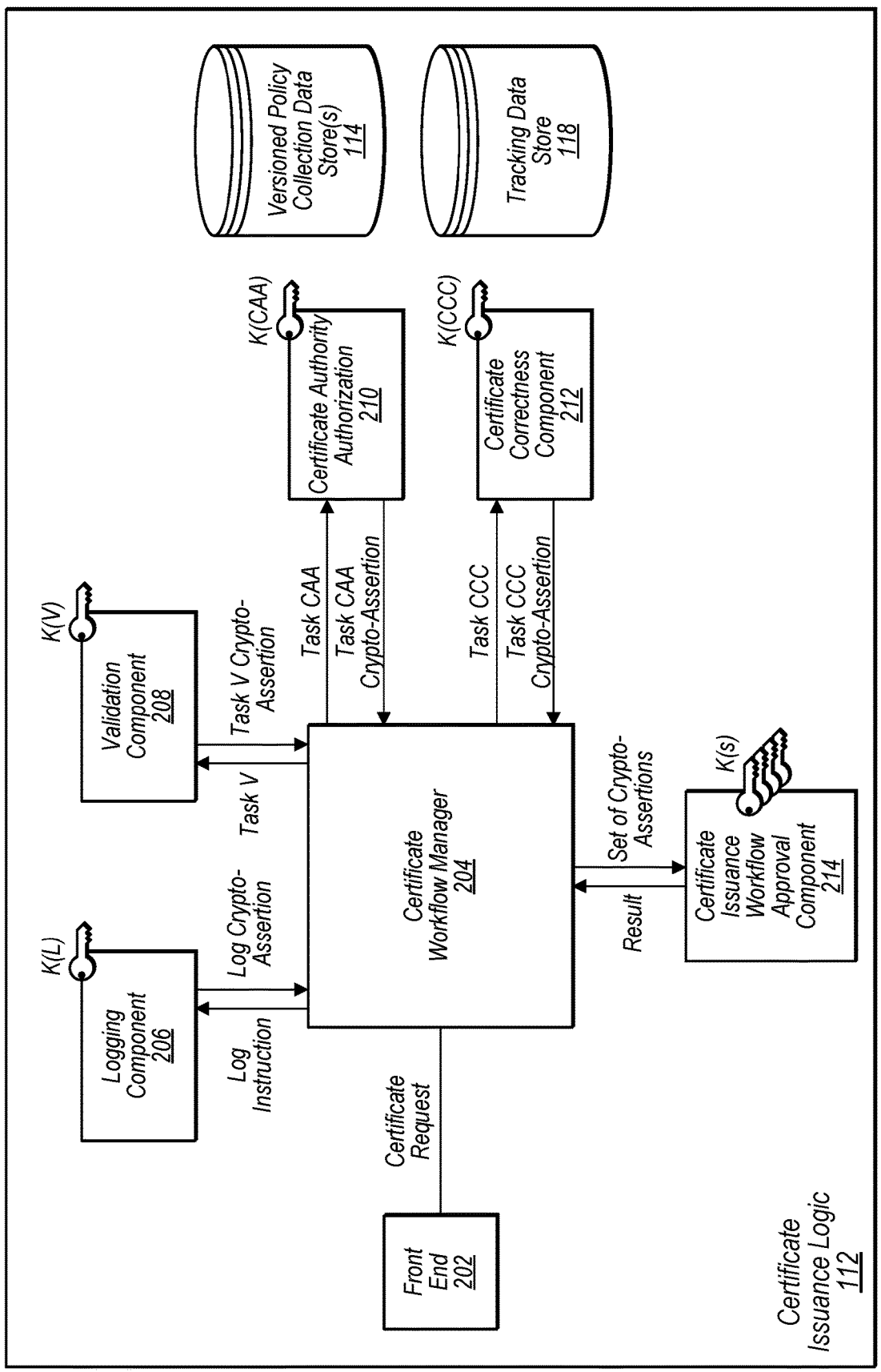
FIG. 2 illustrates a combination block diagram and data flow diagram for certificate issuance logic that implements versioned policy collection management and cryptographic assertions for certificate issuance, according to some embodiments.

FIG. 2 illustrates a combination block diagram and data flow diagram for certificate issuance logic 112 that implements versioned policy collection management and cryptographic assertions for certificate issuance, according to some embodiments. In the illustrated embodiment, certificate issuance logic 112 is depicted as including multiple various components associated with various functionality. In at least the illustrated embodiment, the components may perform at least some of the functionality illustrated in FIGS. 4, 5A-C, 6 and 7, using the cryptographic assertions illustrated in FIG. 3A, in some embodiments.

For example, certificate issuance logic 112 is illustrated having front end 202 for receiving certificate requests and for providing the certificates to the requesting clients (e.g., clients 150A-C). In the illustrated embodiments, a front end 202 may serve as a customer interaction point with the certificate issuance system 112 system. In some embodiment, the front end 202 may perform certificate storage and request management functions. Also illustrated is certificate workflow manager 204 which may function to coordinate performance of tasks for a particular workflow (e.g., a validation or a certificate issuance workflow) among the various components (e.g., components such as logging component 206, validation component 208, certificate authority authorization component 210, certificate correctness components 212, and certificate issuance workflow approval component 214) in order to perform tasks of the certificate issuance workflow.

In embodiments, each of the components 206, 208, 210, and 212 may function to perform requested task, generate a cryptographic assertion (using a key particular to the component) for a result of performing tasks, and return the cryptographic assertion to the workflow manager 204. For example, logging component 206 may receive a log instruction, perform a logging task, generate a cryptographic assertion for a result of performing the logging task using key K(L), and return the cryptographic assertion to the workflow manager 204. Logging component 206 may perform various logging functionality, such as submitting pre-certificates to public certificate transparency logs, as a non-limiting example. Logging may be turned on or off for some workflows, in embodiments.

In another example, validation component 208 may receive a request to perform task V, perform a validation task, generate a cryptographic assertion for a result of performing the validation task using key K(V), and return the task V cryptographic assertion to the workflow manager 204.

Validation component 208 may be responsible for facilitating domain validation requests and asserting if a customer is authorized to have a certificate issued for a given domain, in some embodiments (may perform secure DNS lookups, in some embodiments). In embodiments, validation component 208 may cryptographically bind the corresponding certificate request (CSR) with a successful domain validation check performed by a validation service for every domain included as a subject alternative name (SAN) in the CSR. In embodiments, this will only be created if domain validation succeeds.

In yet another example, certificate authority authorization component 210 may receive a request to perform task CAA, perform an authorization task CAA, generate a cryptographic assertion for a result of performing the authorization task CAA using key K(CAA), and return the task CAA cryptographic assertion to the workflow manager 204. In the illustrated example, the certificate workflow manager 204 sends a task CAA to certificate correctness component 212 and certificate correctness component 212 may perform verification that a certificate has passed correctness checks and is valid (e.g., is a publicly trusted x.509 certificate as a non-limiting example). In embodiments, the certificate correctness component 212 cryptographically binds a certificate request (CSR) with a successful verification result performed by the certificate correctness component 212. This will only be created if the CCC check succeeded for all domains, in embodiments.

In another example, certificate correctness component 212 may receive a request to perform task CCC, perform a correctness task CCC, generate a cryptographic assertion for a result of performing the correctness task CCC using key K(CCC), and return the task CCC cryptographic assertion to the workflow manager 204. In embodiments, the certificate correctness component cryptographically binds a corresponding certificate request (CSR) with a successful additional verification check performed by a certificate authority authorization service 210 for every domain included as a SAN in the CSR. This will only be created if the additional verification check succeeded, in embodiments.

In the illustrated embodiment, certificate workflow manager 204 may function to collect the cryptographic assertions from the components, and send a request to workflow approval component 214 to approve completion of the certificate issuance workflow. In embodiments, the request includes a collection of the cryptographic assertions from the components for the certificate issuance workflow.

A certificate issuance workflow approval component 214 may implement functionality to ensure that all the proper process and correctness verifications required (e.g., required by governing bodies such as the CA/B Forum and Trust Stores, as non-limiting examples) were performed prior to the issuance or publishing of a certificate. For example, in the illustrated embodiment, certificate issuance workflow approval component 214 may function to verify successful completion of the certificate issuance workflow. For example, the workflow approval component 214 may function to validate the cryptographic assertions from the components using different cryptographic keys for respective components, and verify that the validated cryptographic assertions indicate successful completion of the certificate issuance workflow. The certificate authority 110 may function to issue a certificate based on verification by the workflow approval component 214 that the certificate issuance workflow was successfully completed.

In embodiments, various components of the certificate issuance logic 112 may implement various forms of encryption (e.g., symmetric or asymmetric keys, without limitation). For example, keys K(L), K(V), K(CAA), and K(CCC) may be symmetric or asymmetric keys that corresponds to respective ones of keys K(S) of the certificate issuance workflow approval component 214.

FIG. 3A illustrates a cryptographic assertion for versioned policy collection management and cryptographic assertions for certificate issuance, according to some embodiments. The illustrated embodiment depicts fields of the cryptographic assertion as a claim (e.g., all domains are validated), a subject (e.g., a hash of a CSR), a unique request identifier (e.g., illustrated as a component identifier, used to know which component is making the assertion so that the correction key can be used to decrypt the signature of the assertion), and an expiration time. It is contemplated that a cryptographic assertion may have more, fewer, or different fields, in some embodiments. The cryptographic assertion 302 is cryptographically signed (e.g., using a symmetric or private key).

Figure 3B:
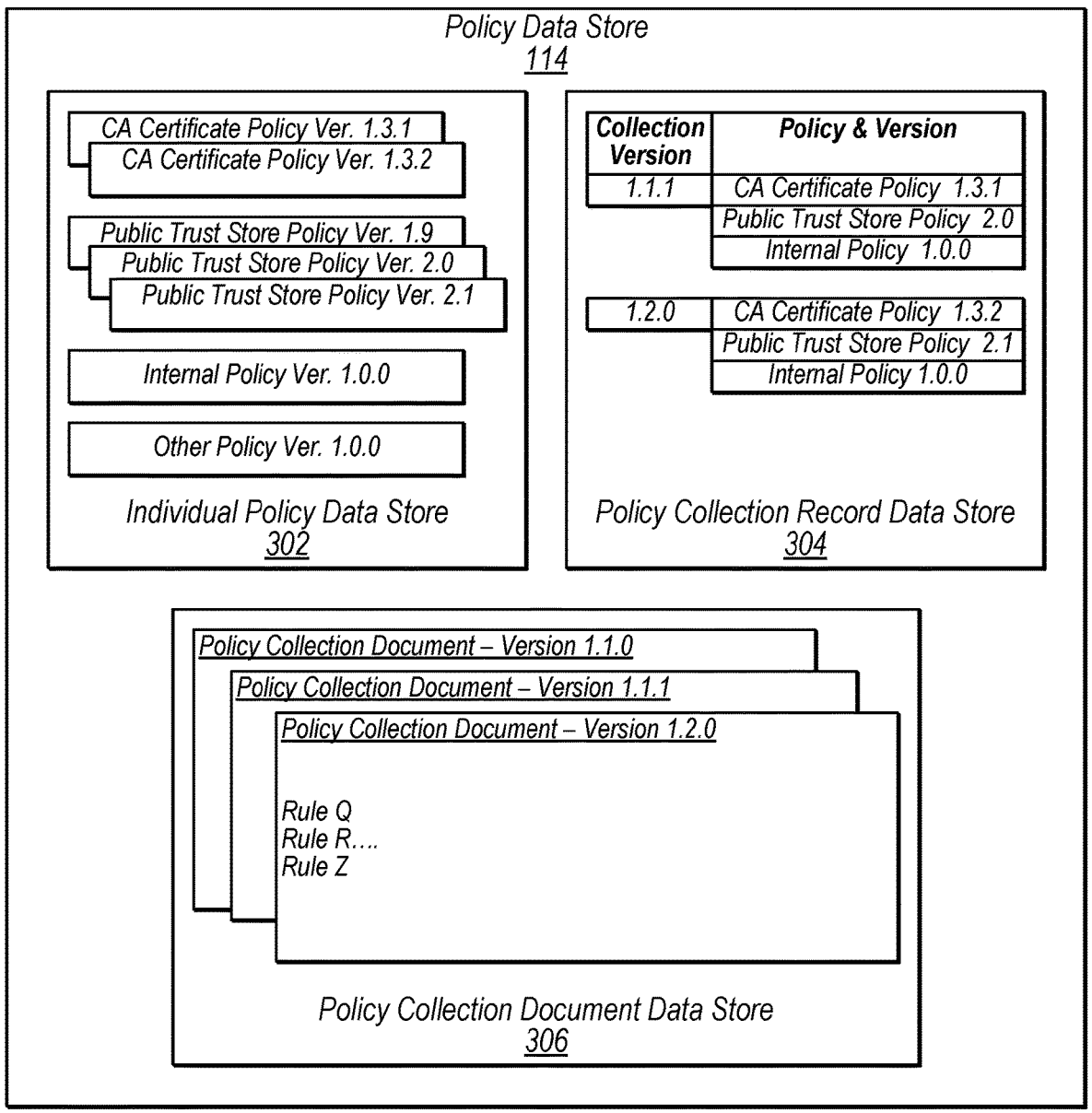
FIG. 3B illustrates a non-limiting, example set of data stores that implement versioned policy collection management and cryptographic assertions for certificate issuance, according to some embodiments.

FIG. 3B illustrates a non-limiting, example set of data stores that implement versioned policy collection management and cryptographic assertions for certificate issuance, according to some embodiments. Policy data store 114 is illustrated as including three different data stores, individual policy data store 302, policy collection record data store 304, and policy collection document data store 306. In some embodiments, one or more of the data stores may be implemented on one or more data stores of a service provider, such as on database service 810, or storage service 830, or other storage service 840, illustrated in FIG. 8 and described below. In some embodiments, records of past version may be retained for auditing.

In the illustrated embodiment, the versions of the policies are illustrated with major and minor version numbers. For example, collection version 1.2.0 illustrates major version number 1.2 in combination with minor version number 0, in some embodiments.

In the illustrated embodiment, individual policy data store 302 functions to store versions of various different individual policies. Updated individual policies may be stored here, in embodiments. Policy collection manager 116 may manage a lifecycle of the individual policies, in embodiments, providing for changes, additions, removal and the like.

Policy collection record data store 304 is illustrated as storing associations between policy collection versions and the individual policy versions that make up a set of policies in the collection. For example, policy collection version 1.1.1 is illustrated as including CA Certificate Policy version 1.3.1, Public Trust Store Policy 2.0 and Internal Policy 1.0.0.

Policy collection document data store 306 functions to store policy collection documents of various versions. In embodiments, policy collection manager 116 may generate, based on the records in the policy collection record data store 304 for example, policy collection documents with the various rules from the corresponding policies in a common format. Such a document may function as a single definitive source for components of the certificate issuance logic 112 to obtain the rules applied as tasks of the certificate issuance workflow are carried out, in embodiments.

Figure 4:
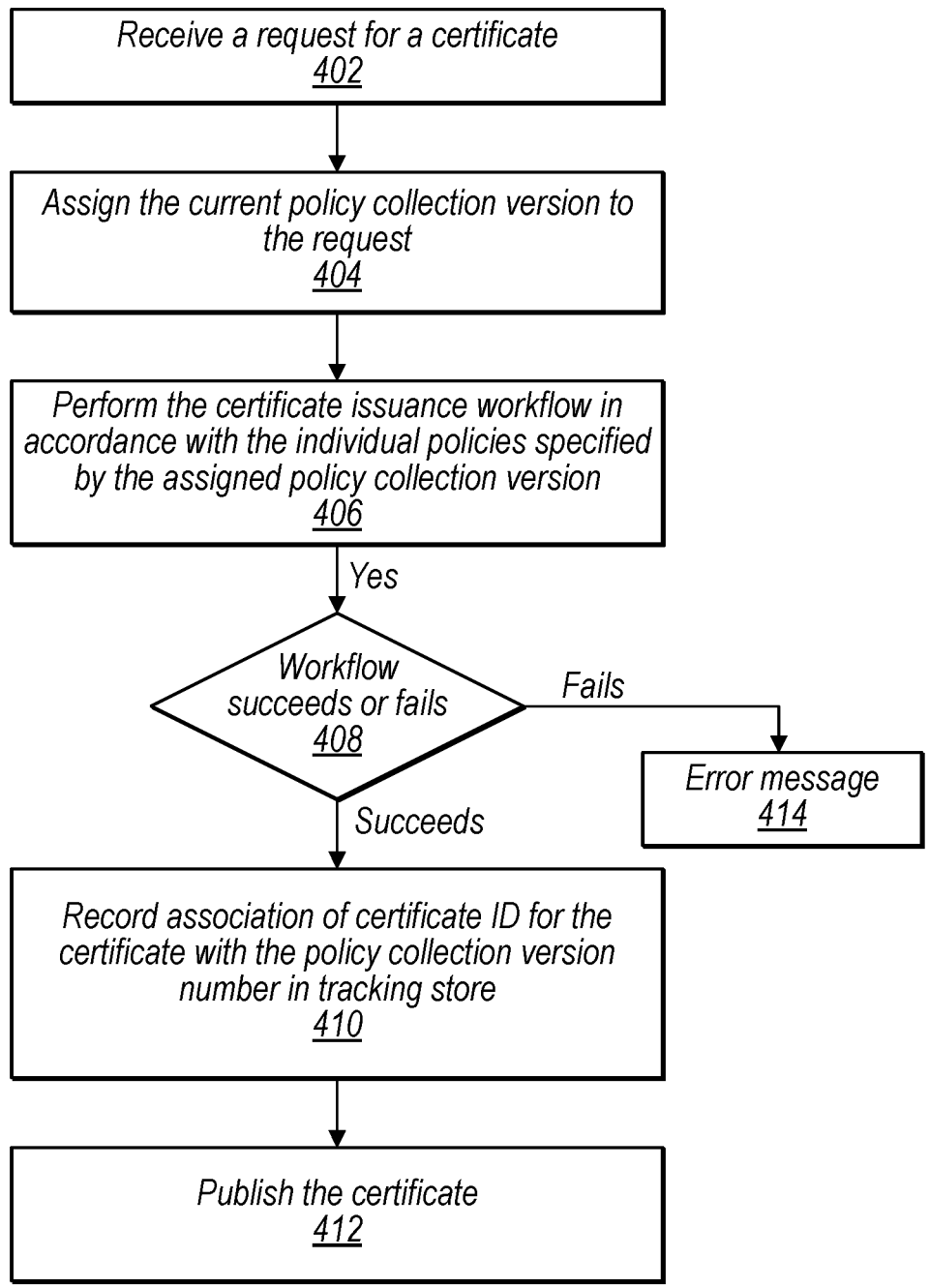
FIG. 4 illustrates a flowchart for issuance of a certificate in a system that implements versioned policy collection management for certificate issuance, according to some embodiments.

FIG. 4 illustrates a flowchart for issuance of a certificate in a system that implements versioned policy collection management for certificate issuance, according to some embodiments. The illustrated process may be performed by the certificate issuance and validation logic 112 of public certificate authority 110, in embodiments.

A request for a certificate is received (block 402), from or by, the front end 202, in various embodiments. For example, the front end 202 may receive requests from clients 150 and send a certificate signature request (CSR) to the certificate workflow manager 204. In the illustrated embodiment, the current policy collection version is assigned to the request (block 404). It is contemplated that in some embodiments, the components that perform the tasks of the workflow may be configured to use the current policy collection version from the versioned policy collection data store (without the assignment). In some such embodiments, it may be possible for two different version to be used during a single workflow (e.g., if there was a policy update midway) and the certificate issuance workflow approval component 214 may fail the overall process of use to two different versions, in some embodiments. Such a system could repeat the process over again, under such circumstances.

At block 406, the certificate issuance workflow is performed in accordance with the individual policies specified by the corresponding (e.g., assigned or otherwise) policy collection version. If the workflow fails (block 408, fail) an error message may be generated and sent. In some embodiments, the system may retry the workflow in the case of a failure. If the workflow succeeds (block 408, succeeds) an association of a certificate ID for the certificate with the policy collection version number is recorded in the tracking store (e.g., tracking data store 118). The certificate is published (block 412). For example, the certificate may be provided in a message as a response to a request, or may be made available to the requesting client otherwise.

Figure 5A:
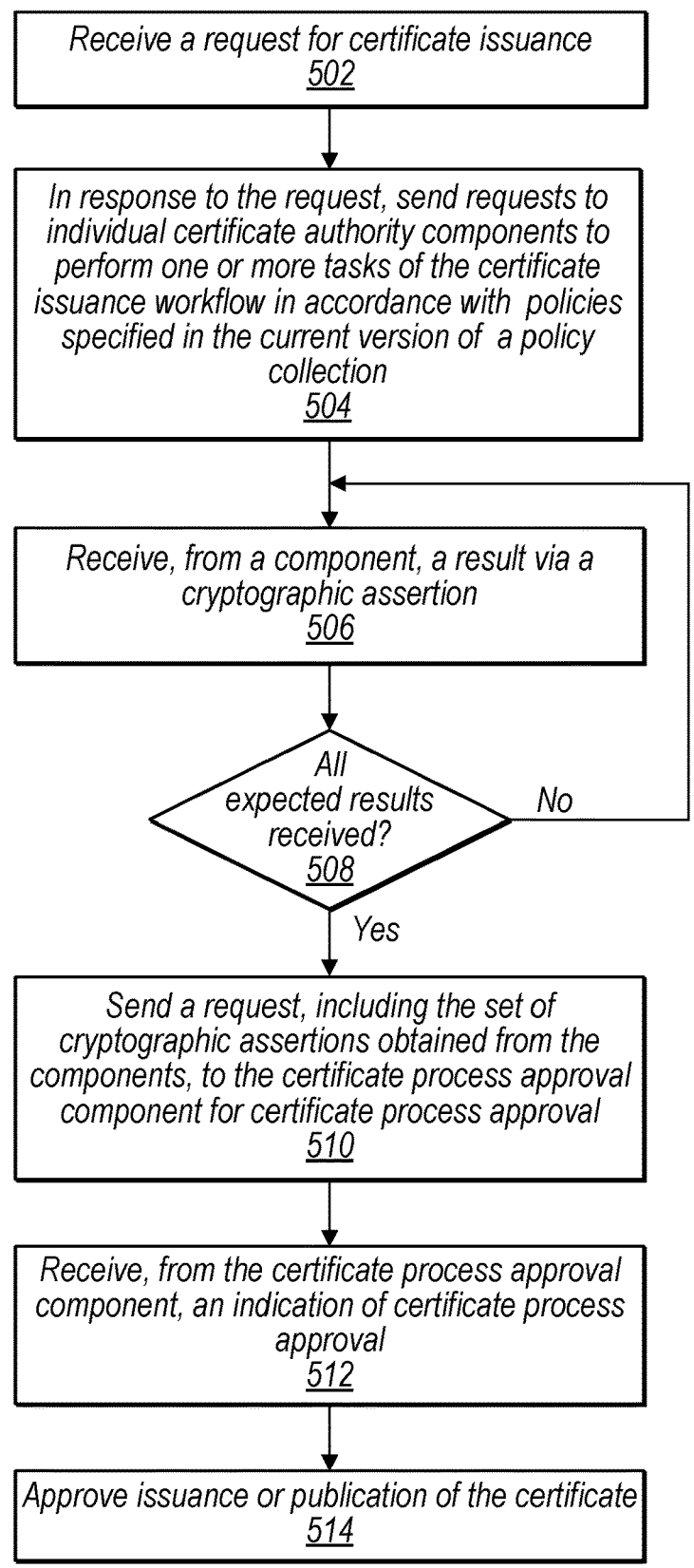
FIG. 5A illustrates a flowchart for issuance of a certificate in a system that implements versioned policy collection management and cryptographic assertions for certificate issuance, according to some embodiments.

FIG. 5A illustrates a flowchart for issuance of a certificate in a system that implements versioned policy collection management and cryptographic assertions for certificate issuance, according to some embodiments. The illustrated functionality may be performed by certificate issuance logic 112, in embodiments.

At block 502, a request for certificate issuance is received (e.g., by front end 202, or by certificate workflow manager 204, in embodiments. At block 504 requests to individual certificate authority components are sent, in response to the request. The requests are to perform one or more steps of the certificate issuance workflow in accordance with policies specified in the current version of a policy collection.

If it is determined that all expected results are received (block 508, yes) a request, including the set of cryptographic assertions obtained from the components is sent to the certificate process approval component for certificate process approval (block 510). Otherwise, some of the expected results are not received (block 508, no) the process may wait to receive the remaining results. In some embodiments, if it is determined that the results are not all received (e.g., after some threshold amount of time or after some number of retries, or the like) the system may generate and send an error, indicating a reason for the error and ending further execution of the illustrated process, in some embodiments.

At block 512, an indication of certificate process approval is received from the certificate process approval component 214, and at block 514, issuance or publication of the certificate is approved. For example, the certificate process approval component 214 may indicate approval to the certificate workflow manager 204, which instructs the front end 202 to publish or otherwise make the certificate available in response to the request.

In embodiments, the process may determine that a response to the request in block 510 (the request for certificate process approval) has not been received (e.g., after some time threshold, or after some threshold number of retries, or similar) or may receive a response indicating that the process is not approved (e.g., for reasons similar to those illustrated in FIG. 5C, described below) and generate and send an error message (e.g., an error message indicating the reason for the failure to approve the certificate process).

Figure 5B:
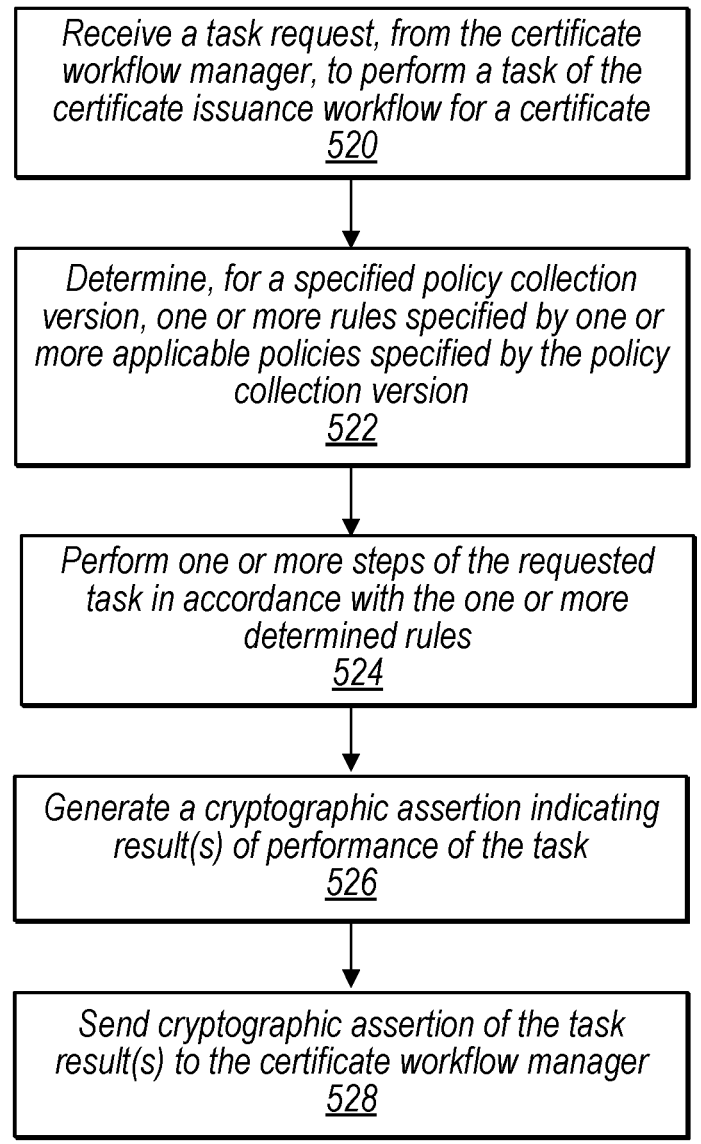
FIG. 5B illustrates a flowchart for a components role in issuance of a certificate in a system that implements versioned policy collection management and cryptographic assertions for certificate issuance, according to some embodiments.

FIG. 5B illustrates a flowchart for a components role in issuance of a certificate in a system that implements versioned policy collection management and cryptographic assertions for certificate issuance, according to some embodiments. The illustrated process may be performed by individual ones of any of logging component 206, validation component 208, certificate authority authorization 210, or certificate correctness component 212, in embodiments.

At block 520, a task request is received from the certificate workflow manager 204 to perform a task (e.g., a logging task, a validation task, a correctness task, etc.) of the certificate issuance workflow for a certificate. For a specified policy collection version, one or more rules specified by the one or more applicable policies specified by the policy collection version is determined (block 522). One or more steps of the requested task are performed in accordance with the one or more determined rules (block 524) and a cryptographic assertion indicating result(s) of performance of the task is generated (block 526). In embodiments, the assertion may be generated using the particular components private key or a key of a symmetric key pair. The cryptographic assertion of the task result(s) is sent to the certificate workflow manager 204, in the illustrated embodiment.

Figure 5C:
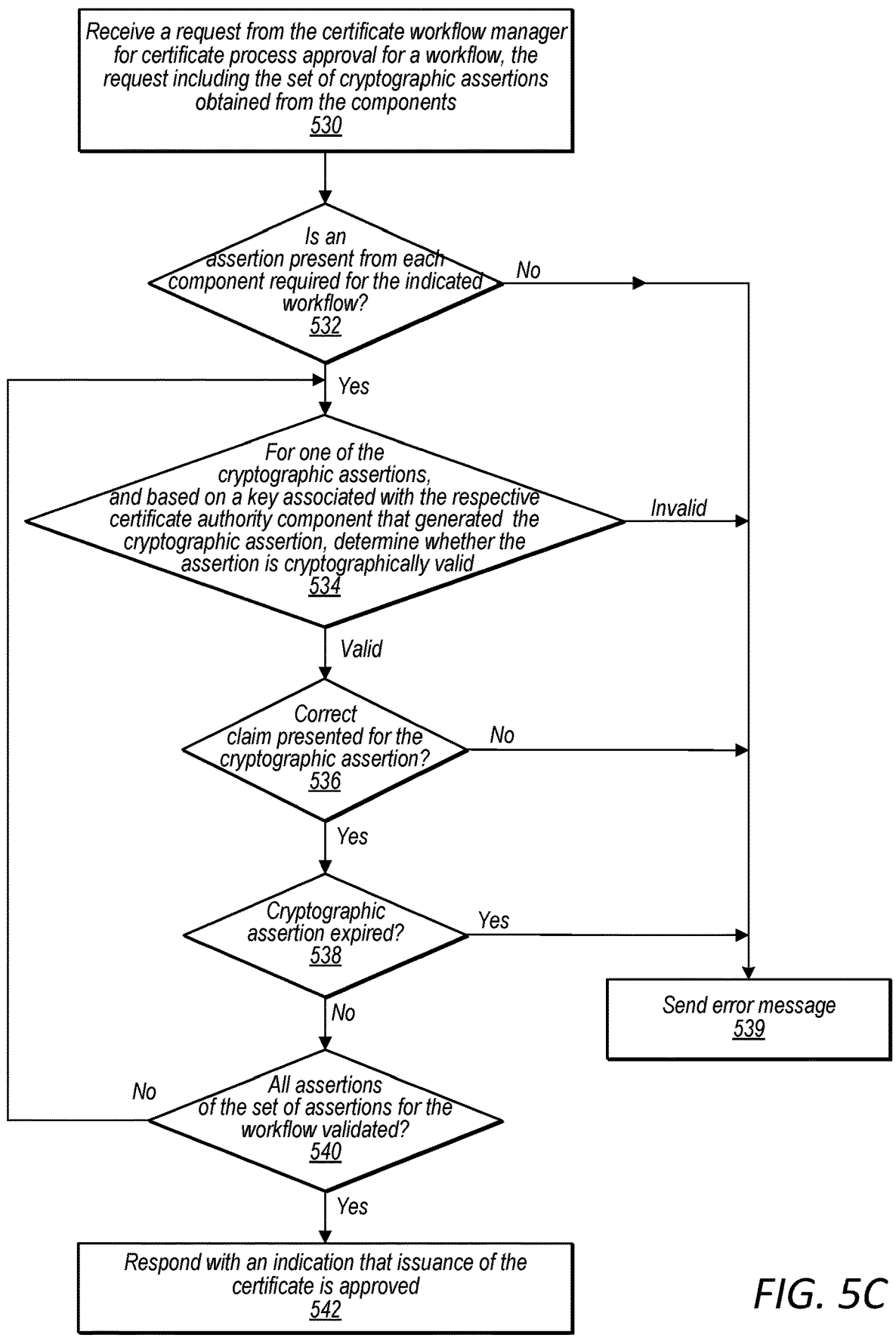
FIG. 5C illustrates a flowchart for a certificate process approval in issuance of a certificate in a system that implements versioned policy collection management and cryptographic assertions for certificate issuance, according to some embodiments.

FIG. 5C illustrates a flowchart for a certificate process approval in issuance of a certificate in a system that implements versioned policy collection management and cryptographic assertions for certificate issuance, according to some embodiments. The functionality illustrated in FIG. 5C may be performed by the certificate issuance workflow approval component 214, in embodiments. In embodiments, the certificate issuance workflow approval component is stateless with respect to certificate requests, and/or with respect to the state of the workflow. The certificate issuance workflow approval component does not track progress of the workflow, in embodiments.

At block 530, a request from the certificate workflow manager 204 is received for a certificate process approval for a workflow, the request includes the set of cryptographic assertions obtained from the components. At block 532, if an assertion from each required component for the indicated workflow is not present (block 532, no) an error message is sent (block 539). In some embodiments the workflow may be restarted at this point. However, if an assertion is present from each component required for the indicate workflow (block 532, yes) the process proceeds to block 534.

Block 534 illustrates that, for one of the cryptographic assertions, and based on a key associated with the respective certificate authority component that generated the cryptographic assertion, cryptographic validity of the assertion is determined. For an invalid assertion, an error message is sent (block 512). In some embodiments the workflow may be restarted at this point. For a valid assertion, correctness of the claim presented for the cryptographic assertion is determined (block 536). For an incorrect claim (536, no), an error message is sent (block 512). In some embodiments the workflow may be restarted at this point. For a correct claim (block 536, yes) expiration of the assertion is examined (block 538). If the assertion has expired (block 538, yes), an error message is sent (block 512). In some embodiments the workflow may be restarted at this point. If the assertion has not expired (block 538, no) the process proceeds to block 540. Block 540 illustrates that a determination of whether all assertions of the set of assertions for the workflow have been validated. If not, the process returns to block 534 and repeats for another assertion of the set. Otherwise (block 540, yes) a response with an indication that issuance of the certificate is approved is returned (block 542). In some embodiments, the certificate issuance workflow approval component 214 bases approval on major update versions, and ignores minor update versions.

In embodiments where the policy collection not assigned, but rather determined by logic internal to the components, the process illustrated in FIG. 5C could verify (via the policy data store) that a policy version of the set has not been updated since initiation of the certificate workflow process for the certificate.

Figure 6:
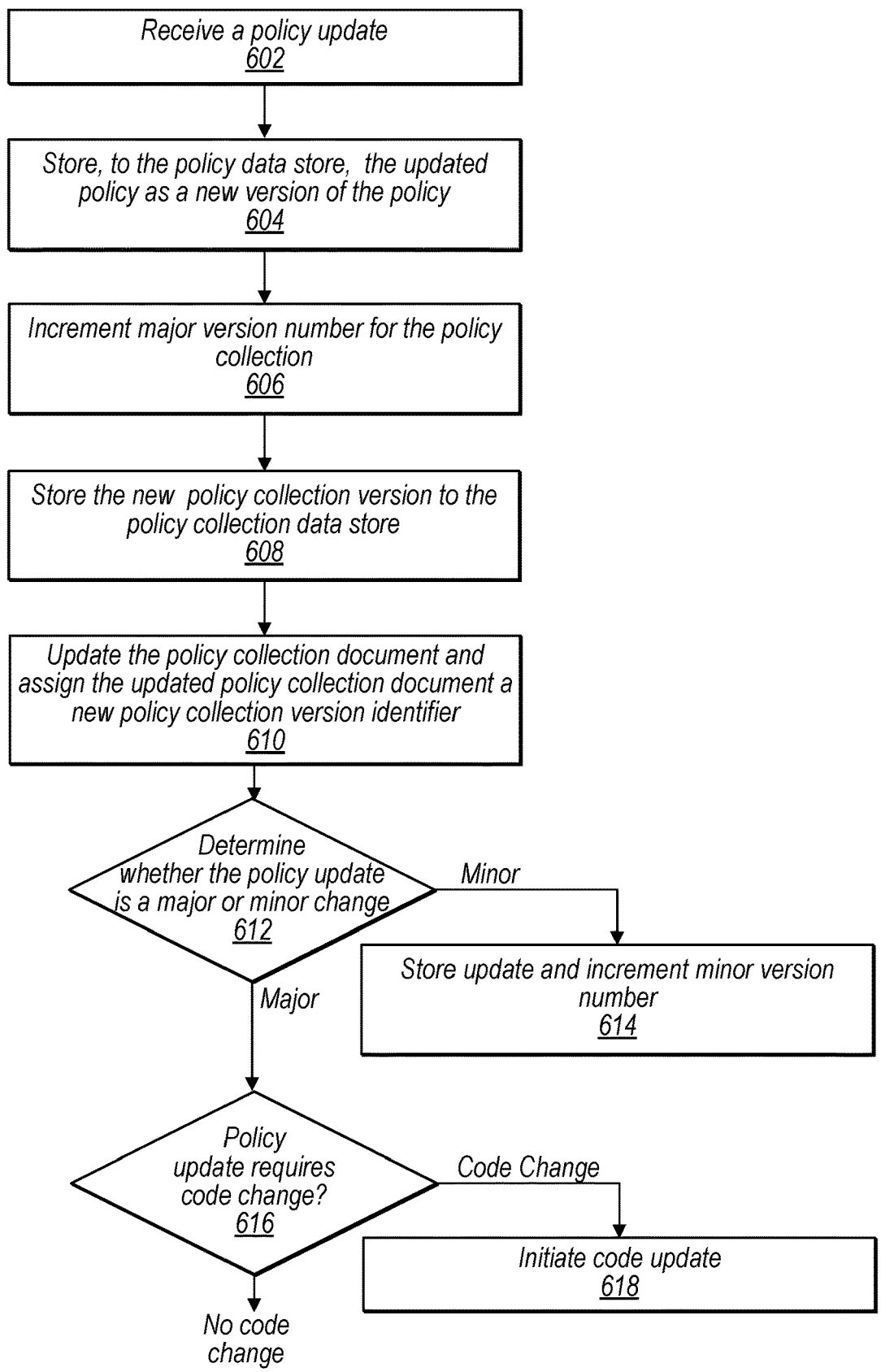
FIG. 6 illustrates policy update process for a system that implements versioned policy collection management and cryptographic assertions for certificate issuance, according to embodiments.

FIG. 6 illustrates policy update process for a system that implements versioned policy collection management and cryptographic assertions for certificate issuance, according to embodiments. Functionality depicted in FIG. 6 may be performed by a policy collection manager 116 of a public certificate authority 110, in embodiments.

At block 602, a policy update is received (from an internal source 120 or an external source 140A-N). The update to the policy is stored to the policy data store as a new version of that policy (block 604) and a major version number for the policy collection is incremented (e.g., 1.3.2 incremented to 1.4.0) (block 606). The new policy collection version is stored to the policy collection data store (block 608). In systems that implement policy collection documents, the corresponding policy collection document is updated and assigned a new policy collection version identifier (blocks 610).

If the policy update is determined to be a minor change (block 612, minor) such as a documentation change or similar, the update is stored and a minor version number for the policy is incremented (block 614) (e.g., 1.3.0 incremented to 1.3.1). In some embodiments if the underlying policy change is minor (e.g., non-substantive) then the policy collection version number is not changed. If the policy update is determined to be a major change (block 612, major) such as deprecation of a cryptographic algorithm or similar), the system determines whether that policy update requires a code change (block 616). In cases where the policy update requires a code change (block 616 code change) the code change is initiated (block 618). Otherwise, no code is changed for the certificate issuance logic 112. In some embodiments, the distinction between a minor and major change is whether the policy update requires a code change (blocks 612 and 616 could collapse into a single decision diamond, for example).

In some embodiments, it is contemplated that gradual rollout and rollbacks of updates to policies may be performed (e.g., generally for large-scale systems involving large numbers of distinct instances of workflows). For example, for a major policy change, the system may assign the updated policy collection version to some subset of the certificate requests while the rest of the certificate requests are assigned the prior policy collection version. For successful workflows operating in accordance with the updated policy collection version, the system may allocate a larger percentage of the certificate requests to the updated policy collection version. If workflows operating in accordance with the updated policy collection version fail, the updated policy collection version may be rolled back.

Figure 7:
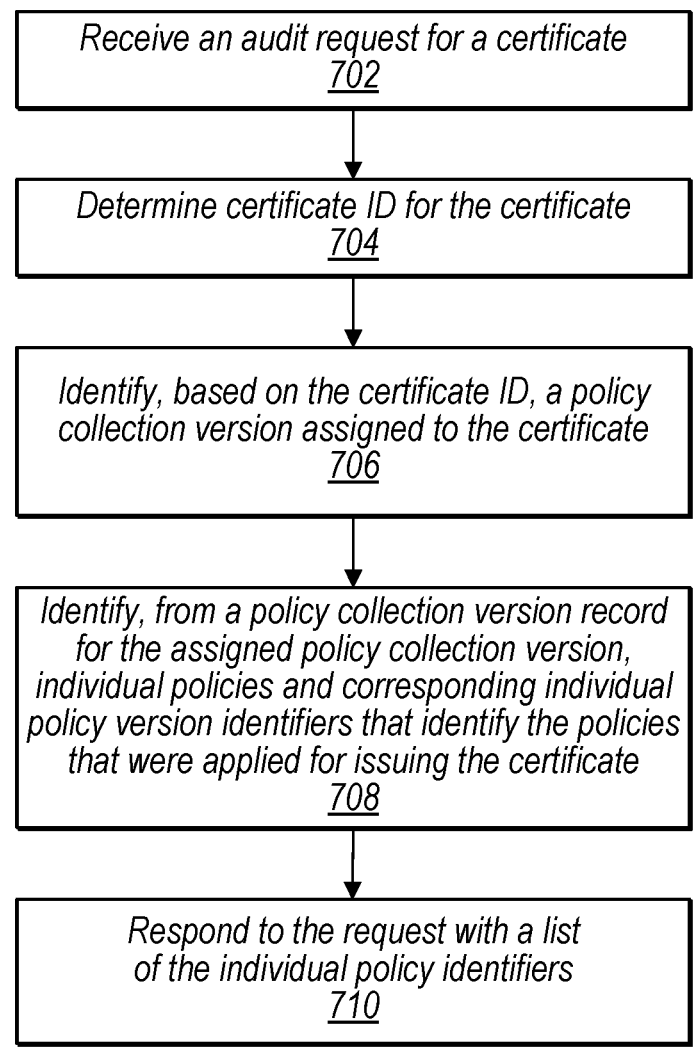
FIG. 7 illustrates an audit request process for a system that implements versioned policy collection management and cryptographic assertions for certificate issuance, according to embodiments.

FIG. 7 illustrates an audit request process for a system that implements versioned policy collection management and cryptographic assertions for certificate issuance, according to embodiments. The illustrated process may be performed by front end 202, or by a dedicated audit interface API of the public certificate authority 110, in embodiments.

At block 702, an audit request for a certificate is received and at block 704, a certificate ID for the certificate is determined (e.g., from the request or otherwise). A policy collection version assigned to the certificate is identified based on the certificate ID (block 706). For example, a record from the tracking data store that associates certificate IDs to corresponding policy collection versions may be queried to determine the policy collection version.

Individual policies and corresponding individual policy version identifiers that identify the policies that were applied for issuing the certificate are identified from a policy collection version record (block 708) and a response to the request with a list of the individual policy identifiers may be generated and sent (block 710). The response may be via an audit API or via a message, or otherwise (e.g., an audit log or record may be generated and stored), in various embodiments.

Figure 8:
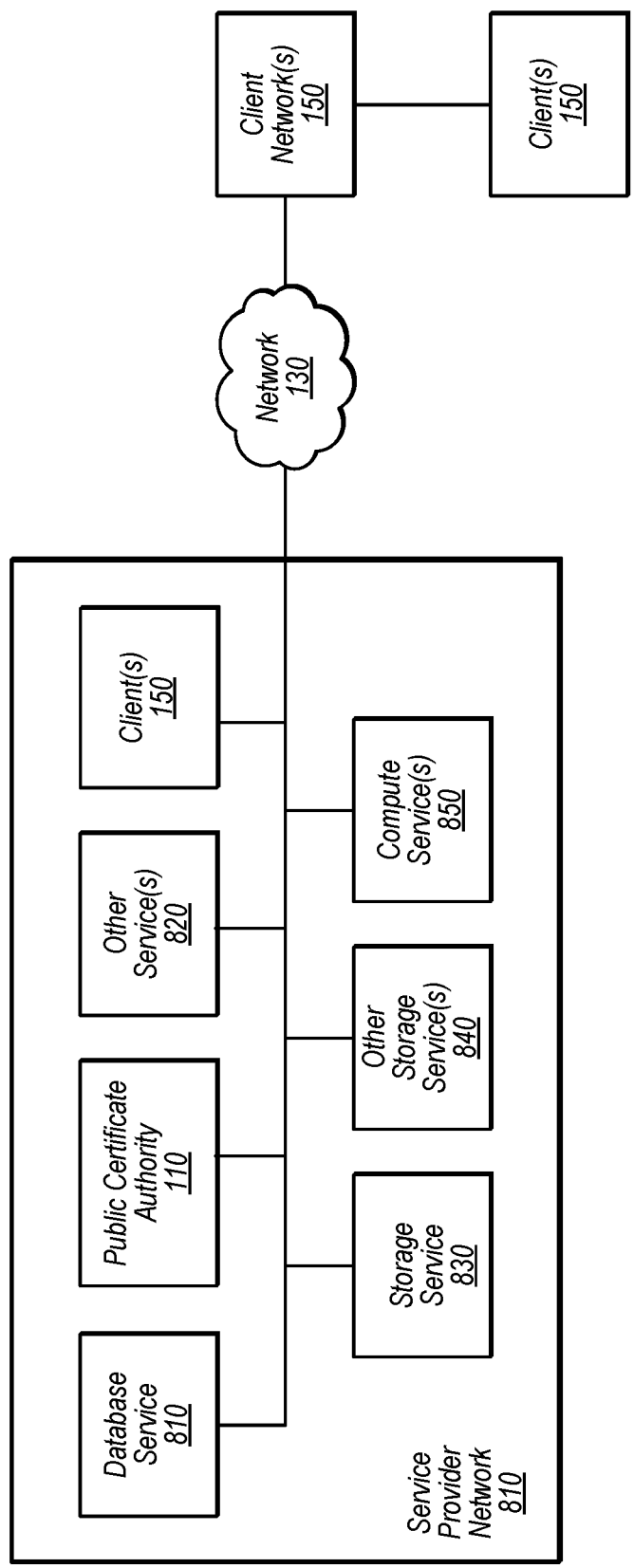
FIG. 8 illustrates a service provider network with various services that implement one or more portions of versioned policy collection management and cryptographic assertions for certificate issuance, according to embodiments.

FIG. 8 illustrates a service provider network 810 that implements versioned policy collection management and cryptographic assertions for certificate issuance as a service, according to embodiments. Depicted is a public certificate authority 110 similar to those illustrated in FIG. 1, that may perform some of the steps illustrated in at least FIGS. 4, 5A-C, 6 and 7. The public certificate authority service 110 is illustrated as part of service provider network 810 that includes database service 810, storage service 830, compute service 850, clients 150 as well as other storage services 840 and other services 820. In at least the illustrated embodiment, the service provider network 810 is communicatively coupled to client networks 130 and clients 150 via network 130. Service provider network 810 may provide one or more services to a plurality of distinct customers, each distinct customer comprising a distinct customer network. One or more of the components in FIG. 8 may be implemented by one or more of the computing nodes 900 illustrated in FIG. 9, in embodiments.

EXAMPLE COMPUTER SYSTEM

Figure 9:
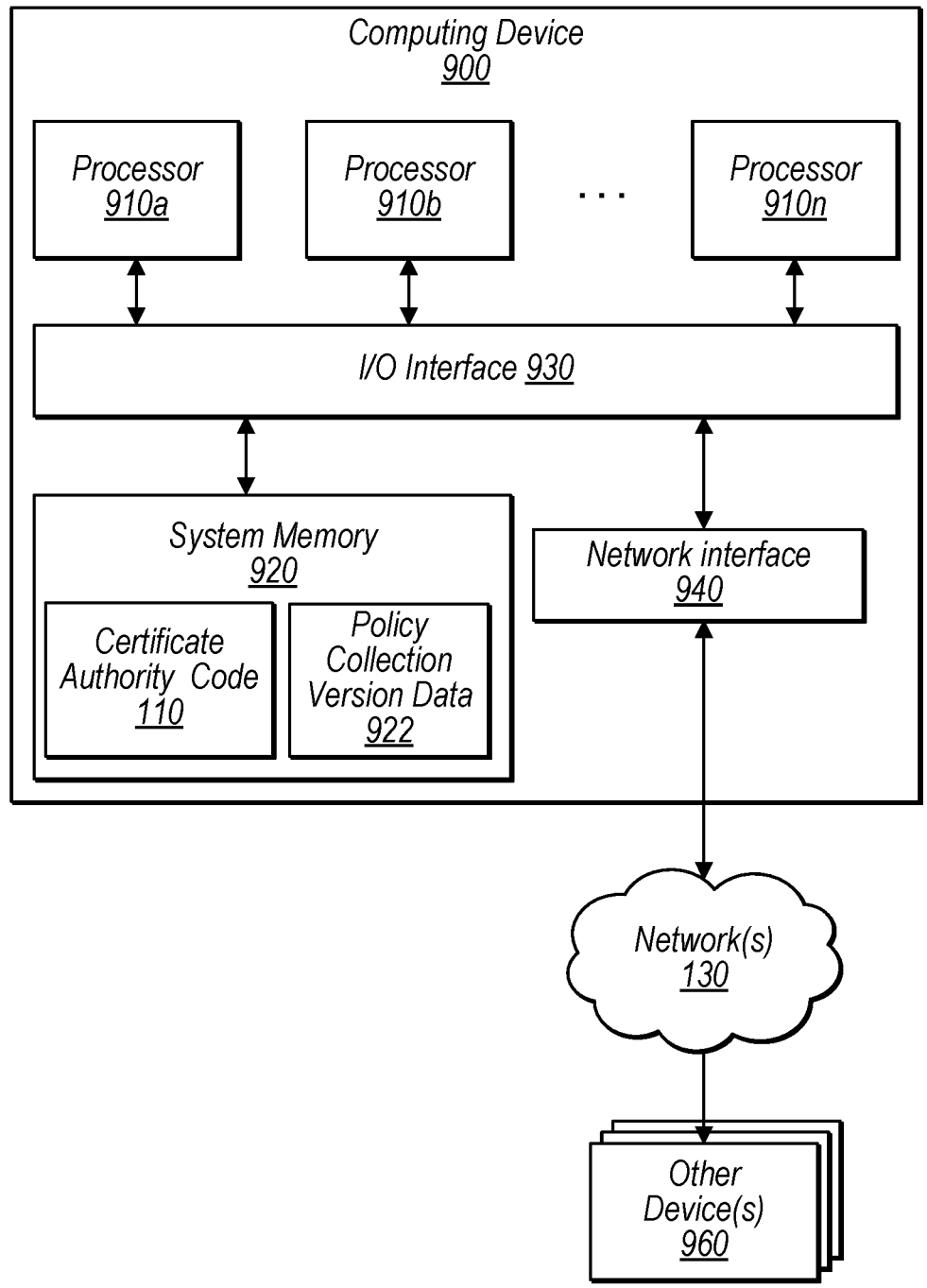
FIG. 9 illustrates an example of a computer system, one or more of which may implement various components described and illustrated throughout the disclosure, including versioned policy collection management and cryptographic assertions for certificate issuance, according to embodiments.

FIG. 9 illustrates an example of a computer system, one or more of which may implement various components described and illustrated throughout the disclosure, including versioned policy collection management and cryptographic assertions for certificate issuance, according to embodiments.

Various portions of systems in FIGS. 1-3 and 9 and/or methods presented in FIGS. 4, 5A-C, 6 and 7 described herein, may be executed on one or more computer systems similar to that described herein, which may interact with various other devices of the system.

In the illustrated embodiment, computer system 900 includes one or more processors 910 coupled to a system memory 920 via an input/output (I/O) interface 930. Computer system 900 further includes a network interface 940 coupled to I/O interface 930, and one or more input/output devices 960, such as cursor control device, keyboard, audio device, and display(s). In some embodiments, it is contemplated that embodiments may be implemented using a single instance of computer system 900, while in other embodiments multiple such systems, or multiple nodes making up computer system 900, may be configured to host different portions or instances of embodiments. For example, in one embodiment some elements may be implemented via one or more nodes of computer system 900 that are distinct from those nodes implementing other elements.

In various embodiments, computer system 900 may be a uniprocessor system including one processor 910, or a multiprocessor system including several processors 910 (e.g., two, four, eight, or another suitable number). Processors 910 may be any suitable processor capable of executing instructions. For example, in various embodiments, processors 910 may be general-purpose or embedded processors implementing any of a variety of instruction set architectures (ISAs), such as the x86, PowerPC, SPARC, or MIPS ISAs, or any other suitable ISA. In multiprocessor systems, each of processors 910 may commonly, but not necessarily, implement the same ISA.

In some embodiments, at least one processor 910 may be a graphics processing unit. A graphics processing unit (GPU) may be considered a dedicated graphics-rendering device for a personal computer, workstation, game console or other computer system. GPUs may be very efficient at manipulating and displaying computer graphics and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the methods disclosed herein for load testing may be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies, and others.

System memory 920 may be configured to store program instructions and/or data accessible by processor 910. In various embodiments, system memory 920 may be implemented using any suitable memory technology, such as static random-access memory (SRAM), synchronous dynamic RAM (SDRAM), nonvolatile/Flash-type memory, or any other type of memory. In the illustrated embodiment, program instructions and data implementing desired functions, such as those described above for a versioned policy collection management and cryptographic assertions for certificate issuance system and method, are shown stored within system memory 920 as certificate authority code 110 and policy collection version data 922, respectively. In other embodiments, program instructions and/or data may be received, sent, or stored upon different types of computer-accessible media or on similar media separate from system memory 920 or computer system 900. Generally speaking, a computer-accessible medium may include storage media or memory media such as magnetic or optical media, e.g., disk or CD/DVD-ROM coupled to computer system 900 via I/O interface 930. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 940. Program instructions may include instructions for implementing the techniques described with respect to any of the FIGs.

In some embodiments, I/O interface 930 may be configured to coordinate I/O traffic between processor 910, system memory 920, and any peripheral devices in the device, including network interface 940 or other peripheral interfaces, such as input/output devices 950. In some embodiments, I/O interface 930 may perform any necessary protocol, timing, or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components. In addition, in some embodiments some or all of the functionality of I/O interface 930, such as an interface to system memory 920, may be incorporated directly into processor 910.

Network interface 940 may be configured to allow data to be exchanged between computer system 900 and other devices attached to a network, such as other computer systems, or between nodes of computer system 900. In various embodiments, network interface 940 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Computing device 900 may include input/output devices that may, in some embodiments, include one or more display terminals, keyboards, keypads, touchpads, scanning devices, voice or optical recognition devices, accelerometers, multi-touch screens, or any other devices suitable for entering or retrieving data by one or more computer system 900. Multiple input/output devices 950 may be present in computer system 900 or may be distributed on various nodes of computer system 900. In some embodiments, similar input/output devices may be separate from computer system 900 and may interact with one or more nodes of computer system 900 through a wired or wireless connection, such as over network interface 940.

Memory 920 may include program instructions (e.g., such as certificate authority code 110), configured to implement embodiments of versioned policy collection management and cryptographic assertions for certificate issuance as described herein, and data storage 922, comprising various data accessible by the program instructions 110. In one embodiment, program instructions 110 may include software elements of a method illustrated in the above figures. Data storage 922 may include data that may be used in embodiments described herein. In other embodiments, other or different software elements and/or data may be included.

Those skilled in the art will appreciate that computer system 900 is merely illustrative and is not intended to limit the scope of as the systems and methods described herein. In particular, the computer system and devices may include any combination of hardware or software that can perform the indicated functions, including computers, network devices, internet appliances, PDAs, wireless phones, pagers, etc. Computer system 900 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 900 may be transmitted to computer system 900 via transmission media or signals such as electrical, electromagnetic, or digital signals, conveyed via a communication medium such as a network and/or a wireless link. Various embodiments may further include receiving, sending, or storing instructions and/or data implemented in accordance with the foregoing description upon a computer-accessible medium. Accordingly, the present invention may be practiced with other computer system configurations. In some embodiments, portions of the techniques described herein (e.g., certificate signing request management) may be hosted in a cloud computing infrastructure.

Various embodiments may further include receiving, sending, or storing instructions and/or data implemented in accordance with the foregoing description upon a computer-accessible medium. Generally speaking, a computer-accessible/readable storage medium may include a non-transitory storage media such as magnetic or optical media, (e.g., disk or DVD/CD-ROM), volatile or non-volatile media such as RAM (e.g., SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
   one or more processors and corresponding memory, configured to implement a workflow manager, configured to:
   responsive to receipt of certificate signing requests:
   for individual ones of the certificate signing requests:
   coordinate performance of a plurality of tasks among a plurality of components to perform a certificate issuance workflow for the certificate signature request in accordance with one or more policies;
   determine whether the certificate issuance workflow succeeds or fails;
   for a determination the certificate issuance workflow failed:
   generate an error message, or
   retry the certificate issuance workflow; and
   for a determination the certificate issuance workflow is successful:
   record success of the certificate issuance workflow in a data store; and
   publish the corresponding certificate.

2. The system of claim 1, wherein said coordinate performance of a plurality of tasks in accordance with the one or more policies comprises coordinate the plurality of tasks in accordance with a policy collection version that specifies a set of individual policies.

3. The system of claim 2, wherein the one or more processors and corresponding memory are configured to:
   assign, responsive to receipt of the corresponding certificate signing request and prior to said coordinate performance of a plurality of tasks for the individual one of the certificate signing requests, a policy collection version to the individual one of the received certificate signing requests.

4. The system of claim 1, further comprising:
   one or more other processors and corresponding memory, of a versioned policy collection data store, configured to store a plurality of policy collection versions that individually specify, according to respective entries in the versioned policy collection data store, respective sets of individual policies.

5. The system of claim 1, wherein said record success of the certificate issuance workflow in a data store comprises record an association of a certificate ID for the corresponding certificate with a policy collection version number in a data store.

6. The system of claim 1, wherein said publish the corresponding certificate comprises:
   provide the corresponding certificate in a message as a response to the corresponding certificate signature request, or
   make the corresponding certificate available to a requesting client that requested the certificate.

7. The system of claim 1, wherein said determine whether the certificate issuance workflow succeeds or fails comprises:
   collect cryptographic assertions from the plurality of components; and
   send a request to a workflow approval component to approve completion of the certificate issuance workflow, wherein the request includes a collection of the cryptographic assertions from the plurality of components for the certificate issuance workflow.

8. A method, comprising:
performing by one or more computing devices:
   receiving, by a workflow manager, certificate signing requests; and
   for individual ones of the certificate signing requests:
   coordinating, by the workflow manager, performance of a plurality of tasks among a plurality of components to perform a certificate issuance workflow for the certificate signature request in accordance with one or more policies;

determining whether the certificate issuance workflow succeeds or fails;
recording a successful certificate issuance workflow in a data store; and
publishing the corresponding certificate.

9. The method of claim 8, further comprising:
assigning, by the workflow manager prior to said coordinating performance of a plurality of tasks for an individual one of the certificate signing requests, the policy collection version to the individual one of the received certificate signing requests.

10. The method of claim 8, wherein said recording a successful certificate issuance workflow in a data store comprises recording an association of a certificate ID for the corresponding certificate with a policy collection version number in a data store.

11. The method of claim 8, further comprising:
storing, to a versioned policy collection data store, a plurality of policy collection versions that individually specify respective sets of individual policies.

12. The method of claim 11, wherein said coordinating performance of a plurality of tasks in accordance with the one or more policies comprises coordinating the plurality of tasks in accordance with a policy collection version that specifies, according to an entry in the versioned policy collection data store, a set of individual policies.

13. The method of claim 8, wherein said publishing the corresponding certificate comprises:
providing the corresponding certificate in a message as a response to the corresponding signing request, or
making the corresponding certificate available to the requesting client.

14. The method of claim 8, wherein said determining whether the certificate issuance workflow succeeds or fails comprises:
collecting cryptographic assertions from the plurality of components; and
sending a request to a workflow approval component to approve completion of the certificate issuance workflow, wherein the request includes a collection of the cryptographic assertions from the plurality of components for the certificate issuance workflow.

15. One or more non-transitory computer-readable media, storing executable program instructions that when executed on or across one or more processors cause the one or more processors to:
responsive to receipt of certificate signing requests:
for individual ones of the certificate signing requests:
coordinate performance of a plurality of tasks among a plurality of components to perform a certificate issuance workflow for the certificate signature request in accordance with one or more policies;
determine whether the certificate issuance workflow succeeds or fails;
for a determination the certificate issuance workflow failed:
generate an error message, or
retry the certificate issuance workflow;
for a determination the certificate issuance workflow is successful:
record success of the certificate issuance workflow in a data store; and
publish the corresponding certificate.

16. The one or more non-transitory computer-readable media of claim 15, storing executable program instructions that when executed cause the one or more processors to:
perform said coordinate the plurality of tasks in accordance with a policy collection version that specifies a set of individual policies.

17. The one or more non-transitory computer-readable media of claim 16, storing executable program instructions that when executed cause the one or more processors to:
assign, responsive to receipt of the corresponding certificate signing request and prior to said coordinate performance of a plurality of tasks for an individual one of the certificate signing requests, the policy collection version to the individual one of the received certificate signing requests.

18. The one or more non-transitory computer-readable media of claim 15, wherein to record a successful certificate issuance workflow in a data store, the program instructions cause the one or more processors to:
record an association of a certificate ID for the corresponding certificate with a policy collection version number in a data store.

19. The one or more non-transitory computer-readable media of claim 15, wherein to coordinate performance of a plurality of tasks in accordance with the one or more policies the executable program instructions cause the one or more processors to:
coordinate the plurality of tasks in accordance with a policy collection version that specifies, according to an entry in the versioned policy collection data store, the set of individual policies.

20. The one or more non-transitory computer-readable media of claim 15, wherein to determine whether the certificate issuance workflow succeeds or fails the executable program instructions cause the one or more processors to:
collect cryptographic assertions from the plurality of components; and
send a request to a workflow approval component to approve completion of the certificate issuance workflow, wherein the request includes a collection of the cryptographic assertions from the plurality of components for the certificate issuance workflow.

* * * * *